Jan. 19, 1937.    J. KATZMAN    2,068,331

FRICTION CLUTCH DRIVING MECHANISM

Filed May 24, 1935

INVENTOR.

JACOB KATZMAN

BY A A de Bonneville

ATTORNEY.

Patented Jan. 19, 1937

2,068,331

UNITED STATES PATENT OFFICE 2,068,331

FRICTION CLUTCH DRIVING MECHANISM

Jacob Katzman, Brooklyn, N. Y.

Application May 24, 1935, Serial No. 23,168

5 Claims. (Cl. 192—17)

This invention relates to a friction clutch driving mechanism and is an improvement of the mechanisms described in my Letters Patent No. 1,647,450, dated November 1st, 1927, and No. 1,775,724 dated September 16th, 1930.

The present invention has for its object the production of adjustable means, whereby the bearing face of a cone pulley can be easily located parallel to a friction ring driven by an electric motor.

The second object of the invention is the production of a friction clutch driving mechanism, in which a journal bracket is adjustably supported, to easily position a driving shaft journaled in the latter, axially in line with the armature shaft of an electric motor.

Figure 1:
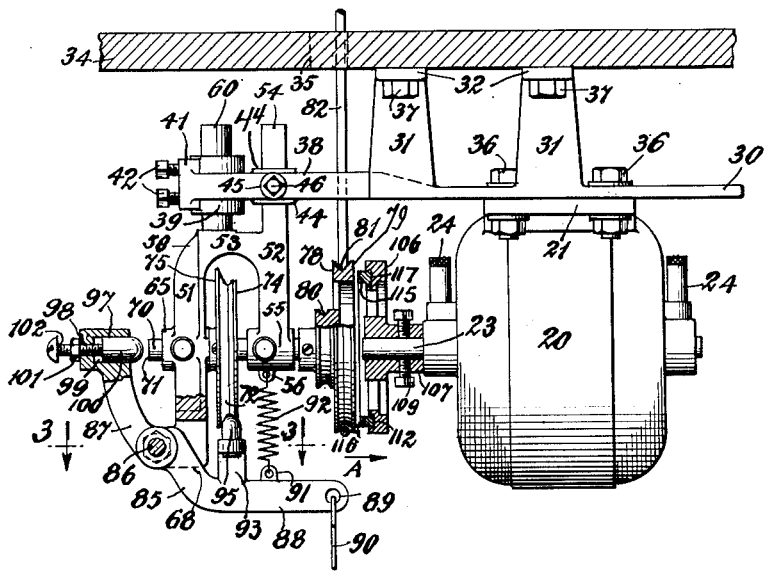
Figure 2:
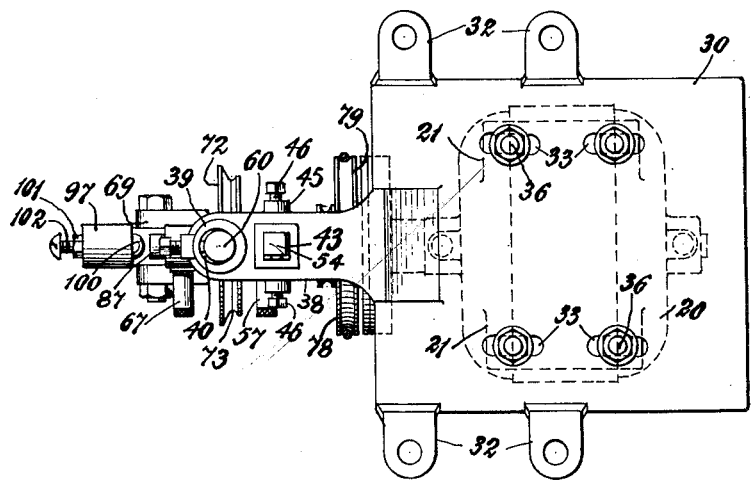
Figure 3:
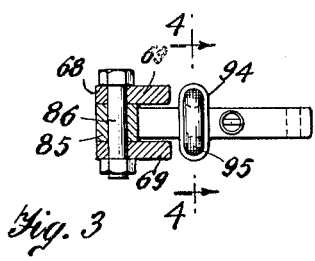
Figure 4:
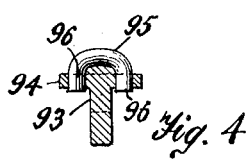

In the accompanying drawing Fig. 1 represents a front view of the improved friction clutch driving mechanism with portions thereof in vertical section; Fig. 2 shows a top view of Fig. 1 with an element omitted; Fig. 3 indicates a section of Fig. 1 on the line 3.3; and Fig. 4 is a section of Fig. 3 on the line 4.4.

An electric motor 20 is indicated having the feet 21. The armature shaft of the motor is shown at 23, and its oil cups are indicated at 24. Binding posts, not shown, are provided for electric wires, not shown, for conducting electric current to the electric motor 20 in the usual way. A supporting bracket 30 has extending up therefrom the legs 31 with the feet 32 and has indicated therein the elongated openings 33. The table 34 of a sewing machine has extending therethrough a pair of openings 35, one of which is shown. Bolts 36 extending through the openings 33 adjustably connect the feet 21 to the bracket 30, and bolts 37 connect the feet 32 to the table 34.

A supporting bar 38 is integral with and extends from the upper face of the supporting bracket 30. A hub 39 having the cylindrical vertical opening 40 is shown at the outer end of the bar 38 and has integral therewith the projection 41. The latter has threaded openings extending therethrough for the clamping screws 42. A square opening 43 extends through the bar 38 and projections 44 extend from the opposite sides of the supporting bar 38 for its opening 43. Threaded bosses 45 extend from the bar 38 for the clamping screws 46.

An adjustable journal bracket 50 comprises the vertical members 51 and 52 connected by the crown portion 53. From the upper end of the member 52 extends the square supporting bar 54 which extends through the square opening 43, and is somewhat smaller in cross-section than the said square opening.

By means of the clamping screws 46 the bar 54 can be clamped at different heights and adjusted somewhat and tilted to different positions.

At the lower end of the member 52 is indicated a journal hub 55 having the eye hook 56 extending therefrom. An oil cup 57 is provided for the journal hub 55. From the crown portion 53 extends the cylindrical supporting bar 60. In the member 51 is indicated the journal hub 65 similar to and axially in line with the journal hub 55. An oil cup 67 is provided for the journal hub 65. At the lower end of the member 51 is indicated the bifurcated journal bracket 68, having the members 69. In the journal hubs 55 and 65 is slidably journaled the driving shaft 70 having the outer end face 71, and which has fastened thereto the brake pulley 72. The brake pulley 72 has indicated therein the circumferential groove 73 with the flanges 74 and 75. The flange 75 is somewhat larger in diameter than the flange 74. To the driving shaft 70 is fastened the cone pulley 78 having the bearing face 79 at one end thereof, and the grooves 80 and 81 for the belt 82, which latter extends through the openings 35, to the driving pulley of a sewing machine. An operating lever 85 is pivoted to the bifurcated journal bracket 68 by the pivot bolt 86. The lever 85 has integral therewith at one end the adjusting arm 87 and at its other end the operating arm 88, having the opening 89 at its outer end. A wire 90 is suspended from the arm 88 with its upper end extending through the opening 89.

The lower end of the wire 90 is usually connected to a treadle, not shown, of the sewing machine, also not shown. An eye hook 91 extends from the operating arm 88 and a spring 92 has its ends connected to the eye hooks 56 and 91. The operating arm 88 has extending therefrom the extension 93 with the upper cross member 94. A brake block 95 of electric insulating material has integral therewith the vertical ends 96. The brake block 95 is seated upon the cross member 94 with its vertical ends 96 extending through openings in the cross member 94.

The adjusting arm 87 has integral with its outer end the boss 97 having the threaded opening 98 and the cylindrical opening 99 larger in diameter. A cylindrical adjusting plug 100 of electric insulating material is positioned in the opening 99. An adjusting screw 102 is in threaded engagement with the threaded opening 98 and bears against the plug 100. A lock nut 101 is provided for the screw 102.

A disc 106 has integral therewith the hub 107, and is supported on the armature shaft 23. Screws 109 clamp the hub 107 to said armature shaft. Adjacent to the periphery of the disc 106 is indicated the dovetail groove 112 in which is tightly seated the friction ring 115 with its operating face 116 and dovetail lower end 117, and which coacts with the adjacent bearing face 79 of the cone pulley 78.

The elements of the friction clutch driving mechanism when not transmitting rotation to its cone pulley 78 from the electric motor 20, are positioned as indicated in the drawing. To transmit rotation to the pulley 78 and thereby to the sewing machine or other mechanism through the belt 82, the operator pulls down the wire 90, by means of which the operating arm 88 swings down against the tension of the spring 92, and the brake block 95 is released from the groove 73 of the brake pulley 72. Immediately after the said brake block 95 has been released the adjusting plug 100 bears against the outer end face 71 of the driving shaft 70. By this means the cone pulley 78 slides in the direction of the arrow A, Fig. 1 and its bearing face 79 is brought into frictional engagement with the adjacent face of the friction ring 115. By this means the rotation of the friction ring 115, which rotates with the armature shaft 23, of the electric motor 20, is transmitted to the cone pulley 78 and the latter through the belt 82 turns the pulley of the sewing machine or other mechanism to be driven. When the wire 90 is released the tension of the spring 92 swings down the adjusting arm 87 and spaces the adjusting plug 100 from the outer end face 71 of the driving shaft 70, and immediately thereafter the brake block 95 bears against the flange 75 of the brake pulley 72 and is seated in the groove 73 thereof. The said pulley 72 thereby slides on the driving shaft 70 in a direction opposite to the arrow A and the bearing face 79 of the cone pulley 78 is spaced from the friction ring 115 as shown in the drawing and the shaft 70 stops rotating.

When assembling the parts of the friction clutch driving mechanism it will be noted that the electric motor 20 can be adjusted in the direction of its longitudinal axis, by clamping it in different positions to the supporting bracket 30, by means of the bolts 36 and elongated openings 33 in the said bracket 30. The adjustable journal bracket 50 can be raised, tilted to different angular positions or lowered by clamping the cylindrical supporting bar 60 in different positions in the hub 39, by means of the clamping screws 42. The said bar 60 can also be swung in a horizontal plane and clamped in the desired position. The diameter of the opening 40 being greater than the diameter of the bar 60 and the cross section of the square opening 43 being greater than the cross section of the adjusting and supporting bar 54 will allow the adjustments. Also the said bar 54 can be secured to the supporting bar 38 in different angular positions in a plane of the longitudinal axis of said bar 38, by reason of the area of the opening 43 being greater than the area of the cross section of the bar 54, and can be also secured at different heights.

The adjustability of the journal bracket 50 is provided to secure the parallelism of the bearing face 79 of the cone pulley 78 and the coacting operating face 116 of the friction ring 115.

It will be noted that when the brake block 95 rises to engage groove 73 of the brake pulley 72, it will bear against the large flange 75 of said pulley and thereby the said pulley is moved in a direction opposite to the arrow A, and separates the bearing face 79 of the pulley 78 from the friction ring 115.

It will be noted that the electric motor 20 can be clamped in different positions to the supporting bracket 30, and that the journal bracket 50 can be clamped in different positions, and therefore the friction clutch driving mechanism can be connected to electric motors of different constructions and different sizes.

Various modifications may be made in the invention and the present exemplification is to be taken as illustrative and not limitative thereof.

Having described my invention, I claim:

1. In a friction clutch driving mechanism the combination of a supporting bracket, a journal bracket, means to suspend the journal bracket from the supporting bracket, a driving shaft slidably journaled in said journal bracket, a pulley having a bearing face fastened to the shaft, an electric motor with its armature shaft normally coaxial with said driving shaft, a disc fastened to the armature shaft of the electric motor, a friction ring supported in said disc coacting with the bearing face of the pulley and means to slidably move the driving shaft to position the pulley with its bearing face against said friction ring, the means suspending the journal bracket from the supporting bracket constructed to tilt the said driving shaft in all directions to locate the plane of the bearing face of the pulley parallel to the plane of the friction ring.

2. In a friction clutch driving mechanism, the combination of a supporting bracket having a square opening, a hub integral with the supporting bracket having a cylindrical opening, a journal bracket, a cylindrical supporting bar integral with the journal bracket, extending through the opening of said hub and somewhat smaller in diameter than the opening in the hub, means to adjustably connect the cylindrical supporting bar to said hub, a second supporting bar extending from the journal bracket square in cross section extending through said square opening and smaller in cross section than said square opening, means to adjustably connect the second supporting bar to the supporting bracket, a driving shaft slidably journaled in the journal bracket, a pulley fastened to the driving shaft, an electric motor adjacent to the driving shaft and means to transmit rotation from said electric motor to said pulley.

3. In a friction clutch driving mechanism, the combination of a supporting bracket, an electric motor adjustably connected to said supporting bracket, a journal bracket, means to detachably connect the journal bracket to the supporting bracket in any tilted position, a driving shaft slidably journaled in the journal bracket and adapted to be maintained coaxially with the armature shaft of said motor, a brake pulley having a circumferential groove fastened to the driving shaft, a cone pulley having a bearing face fastened to the driving shaft, a belt for the cone pulley, an operating lever pivoted to the adjustable journal bracket, the operating lever comprising a pair of arms, an adjusting plug supported at the end of one of said arms axially in line with the driving shaft, a brake block carried by the other arm of the operating lever adapted to be seated in the groove of the brake pulley, a spring extending between the latter arm and the journal bracket, a disc fastened to the armature shaft of the electric motor and a friction ring supported in said disc coacting with the bearing face of the cone pulley.

4. In a friction clutch driving mechanism, the combination of a supporting bracket, an electric motor connected to the supporting bracket, a disc fastened to the armature shaft of the electric motor, a friction ring supported in said disc, an adjustable journal bracket detachably connected to the supporting bracket, means to maintain the journal bracket in any tilted position, a driving shaft slidably journaled in the journal bracket and coaxial with the armature shaft of said motor, a brake pulley having a circumferential groove fastened to the driving shaft, circumferential flanges integral with the brake pulley on opposite sides of its groove, one of said flanges larger in diameter than the other, a pulley having a bearing face fastened to the driving shaft coacting with said friction ring, a belt for the latter pulley extending to a mechanism to be driven, an operating lever pivoted to the adjustable journal bracket, the operating lever comprising a pair of arms, an adjusting plug supported at one end of one of said arms axially in line with the driving shaft and adapted to bear against the adjacent end of the latter, a brake block carried by the other arm of the operating lever adapted to be seated in the groove of the brake pulley, the said brake block when entering the seat of the brake pulley bearing against the larger flange of the latter and thereby forcing the pulley having the bearing face from the friction ring of said disc, a spring extending between the latter arm and said journal bracket and means to swing down the latter arm against the tension of said spring.

5. In a friction clutch driving mechanism, the combination of a supporting bracket, a journal bracket depending from the supporting bracket, means coacting with both of said brackets to detachably clamp the latter bracket in any tilted position, a driving shaft journaled in said journal bracket, a pulley fastened to said shaft, rotating means adjacent to the driving shaft and means to transmit rotation from said rotating means to said pulley.

JACOB KATZMAN.